(12) United States Patent
Oddsen, Jr. et al.

(10) Patent No.: US 7,510,154 B2
(45) Date of Patent: Mar. 31, 2009

(54) CABINET MOUNT ARM

(75) Inventors: Odd N. Oddsen, Jr., Easton, PA (US); Bradley A. Derry, Allentown, PA (US)

(73) Assignee: Innovative Office Products, Inc., Easton, PA (US)

( * ) Notice: Subject to any disclaimer, the term of this patent is extended or adjusted under 35 U.S.C. 154(b) by 532 days.

(21) Appl. No.: 11/281,146

(22) Filed: Nov. 17, 2005

(65) Prior Publication Data

US 2007/0120024 A1 May 31, 2007

(51) Int. Cl.
*E04G 3/00* (2006.01)
(52) U.S. Cl. .............. 248/278.1; 248/284.1; 248/282.1; 361/681
(58) Field of Classification Search .............. 248/284.1, 248/292.13, 282.1, 278.1, 276.1, 285.1, 917, 248/918, 919, 921, 922, 923; 361/681, 682
See application file for complete search history.

(56) References Cited

U.S. PATENT DOCUMENTS

| | | | |
|---|---|---|---|
| 3,463,520 A | 8/1969 | Turro | |
| 5,092,552 A | 3/1992 | Dayton et al. | |
| 5,335,142 A | 8/1994 | Anderson | |
| 5,975,472 A * | 11/1999 | Hung | 248/278.1 |
| 6,015,120 A | 1/2000 | Sweere et al. | |
| 6,244,553 B1 | 6/2001 | Wang et al. | |
| 6,367,756 B1 | 4/2002 | Wang et al. | |
| 6,378,830 B1 * | 4/2002 | Lu | 248/278.1 |
| 6,478,275 B1 * | 11/2002 | Huang | 248/284.1 |
| 6,505,988 B1 | 1/2003 | Oddsen, Jr. | |
| 6,592,090 B1 | 7/2003 | Li | |
| 6,672,553 B1 * | 1/2004 | Lin | 248/276.1 |
| 6,758,454 B2 | 7/2004 | Smed | |
| 6,796,541 B2 | 9/2004 | Lu | |
| 6,857,610 B1 * | 2/2005 | Conner et al. | 248/284.1 |

* cited by examiner

*Primary Examiner*—Korie Chan
*Assistant Examiner*—Steven Marsh
(74) *Attorney, Agent, or Firm*—Design IP (57) ABSTRACT

A cabinet mount arm including an arm having an elongate ring and a housing extending therefrom. The elongate ring includes a first edge, a second edge, an interior wall and an exterior wall. The interior wall and the exterior wall extend between the first edge and the second edge. The elongate ring further includes an aperture extending from the first edge to the second edge and defined by the interior wall of the elongate ring. The cabinet mount arm further includes a pivoting and locking mechanism enabling the arm to move relative to a swivel coupler.

14 Claims, 12 Drawing Sheets

CABINET MOUNT ARM

BACKGROUND OF THE INVENTION

The present invention relates to a support apparatus for mounting a peripheral device and, more particularly, an arm for suspending and supporting a flat screen peripheral device such as a computer monitor or television.

Adjustable stands and arms for use with electronic or other equipment are known in the art. Such stands are used to suspend a device above or below a horizontal surface, such as the bottom of a cabinet or from a ceiling, as well as above a desk top, in order that the device meets eye level or some other desired height.

Support arms also serve to hold cumbersome objects that are designed to be placed away from a surface due to ventilation requirements or other concerns. In conjunction with support arms, it is known in the art to also provide mechanical extension arms and/or tilters in order to position the supported equipment in the desired location. Typically, an extension arm is attached to the suspension structure and may then be attached to, among other things, a computer monitor. The extension arm allows the easy manipulation and repositioning of the peripheral device into a desired location.

Despite the considerable efforts in the art toward the development of extensions and support arms, advanced, compact and easy to used devices are desirable.

SUMMARY OF THE INVENTION

The present invention preferably includes a cabinet mount arm having an arm with an elongate ring and a housing extending therefrom. The elongate ring preferably includes a first edge, a second edge, an interior wall and an exterior wall. The interior wall and the exterior wall extend between the first edge and the second edge. The elongate ring may also include an aperture extending from the first edge to the second edge and defined by the interior wall. A through-hole extending through the elongate ring, transverse to the aperture, may extend from the exterior wall to the interior wall and be in communication with the aperture.

The cabinet mount arm also preferably includes an anchoring mechanism disposed within the through-hole of the elongate ring. The cabinet mount arm may also include a tubular member having a first end, a second end and an exterior. The tubular member may also include a channel extending from the first end to the second end as well as a slot extending along the exterior of the tubular member and in communication with the channel. The positioning of the slot and the channel enables the tubular member to constrict and expand about an axis passing through a center of the tubular member. In one preferred embodiment, the tubular member is preferably disposed within the aperture of the elongate ring when assembled.

The cabinet mount arm may also include a swivel coupler having a base portion, a first extension and a second extension. Each of the extensions preferably extends outwardly from the base portion and forms a gap therebetween. Each of the first and second extensions also preferably has an exterior, interior and an aperture extending therebetween. The aperture of at least one if not both of the first extension and second extension preferably includes internal threads.

The cabinet mount arm may also include a cylindrical rod having a first end, a middle portion and a second end. The first end may have external threads. In one preferred embodiment, the rod is disposed within the apertures of the first and second extensions and the channel of the tubular member with the external threads of the first end engaged to the internal threads of the aperture of the first extension and/or second extension.

In a preferred embodiment, the anchoring mechanism may be translated through the through-hole of the arm and directed toward the aperture of the elongate ring until it contacts the tubular member and causes the tubular member to construct about the cylindrical rod to thereby lock the tubular member to the cylindrical rod.

In one preferred embodiment, the collar is adapted for mounting to a vertical or horizontal platform and a second element is rotatably mounted to the collar. The collar may also include a flange and a base with the flange having a recess disposed along an aperture extending therethrough the flange and the base. The second element may include an aperture extending through the base such that the swivel coupler is rotatably coupled to the collar by placing the base of the swivel coupler into the recess of the collar and placing a rivet through the aperture of the base of the second element and into the aperture of the collar.

In one preferred embodiment, prior to locking the tubular member to a cylindrical rod, the elongate ring may pivot about the cylindrical rod.

The cabinet mount arm may also include an arm having a post with a first end and a second end. The first end of the post may include a plurality of ridges disposed thereon which are engagable to a plurality of ridges disposed in an alcove of the housing the arm. The housing may also include a channel extending through the housing and in communication with the alcove. This enables the first end of the post to place through the channel and into the alcove such that the plurality of ridges on the post may engage the plurality of the ridges in the alcove. The housing may also include a through-hole and a fastener disposed therein. The through-hole preferably extends through the housing and into communication with the channel such that when the post is disposed within the channel, the fastener may be translated through the channel into position so as to engage the post. For this reason, the post may include a slot to which the fastener engages the post.

On one preferred embodiment, the slot is elongated and permits the post to be translated along the longitudinal axis extending from the first end of the post to the second end of the post while the slot remains aligned with the through-hole of the housing. The second end of the post may be attached to an elongated ring which is adapted for being pivotably coupled to a plate.

DETAILED DESCRIPTION

Figure 1:
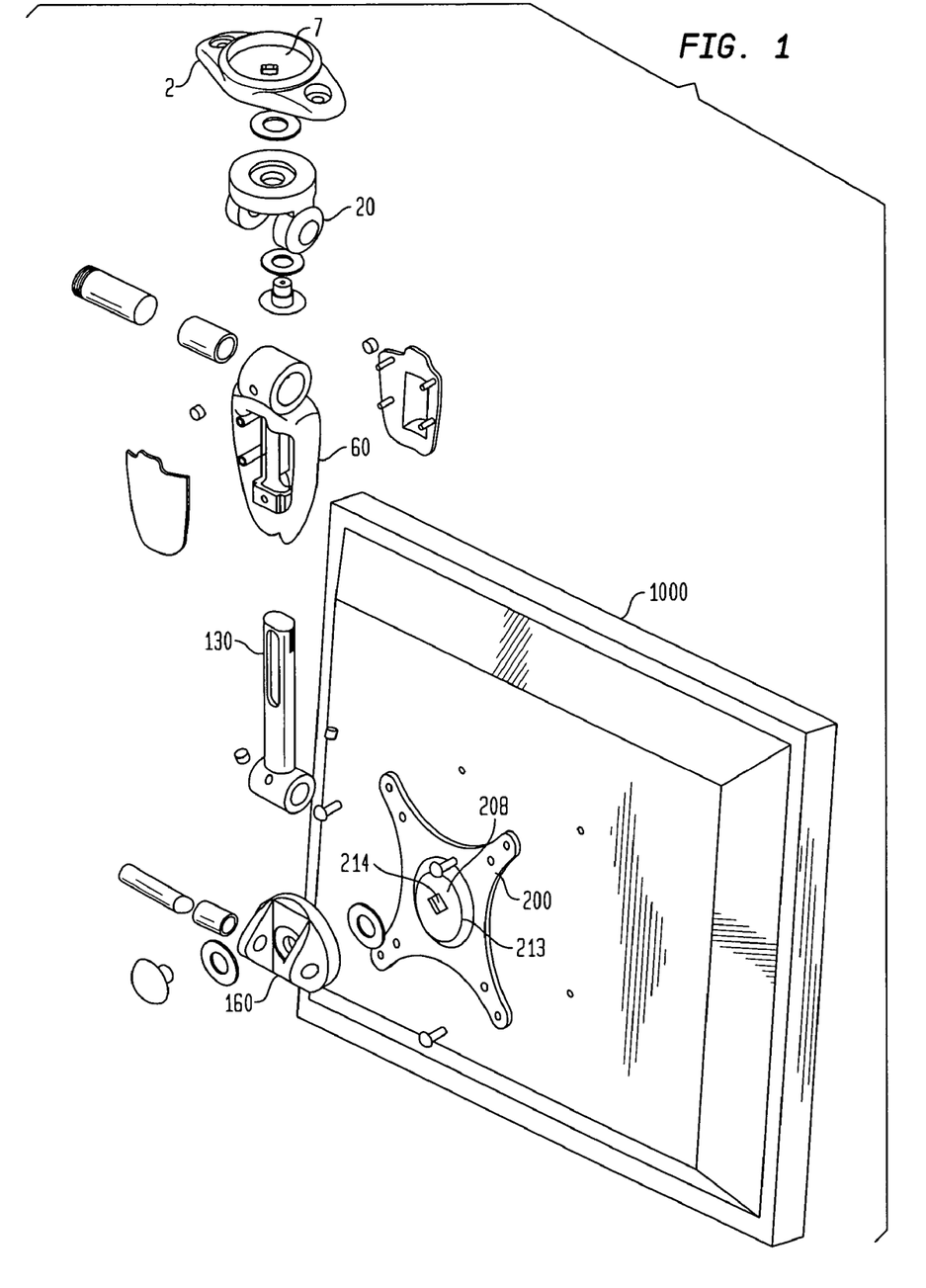
FIG. 1 is an exploded view of a cabinet mount arm in accordance with an embodiment of the present invention.

The present invention is directed to a cabinet mount arm for connecting, by way of example, flat screens or computer monitors and the like to a cabinet. FIG. 1 of the present reference illustrates an exploded view of the various elements and features that may be included within a cabinet mount arm 1 of the present invention. Such elements may include a collar 2, a swivel coupler 20, an arm 60, an arm 130, a pivot coupler 160 and a plate 200. The various features and elements are described in detail below, along with additional features.

Figure 2A:
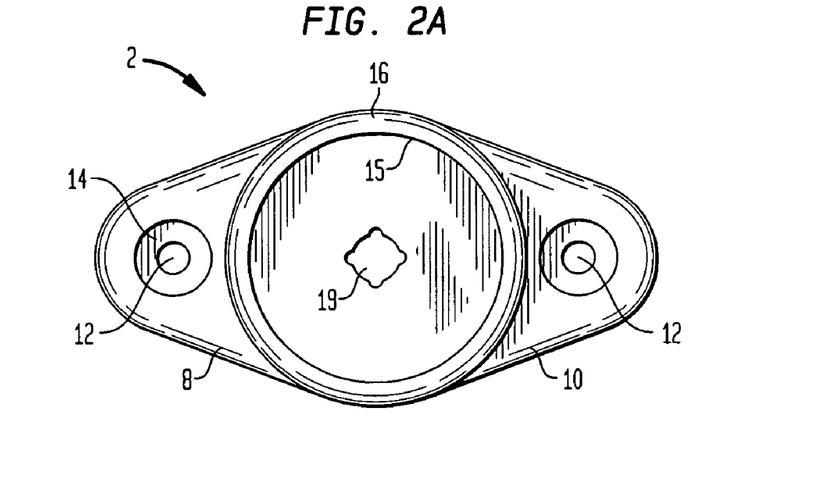
FIGS. 2A-2C are respective views of an embodiment of a collar according to the present invention.
Figure 2B:
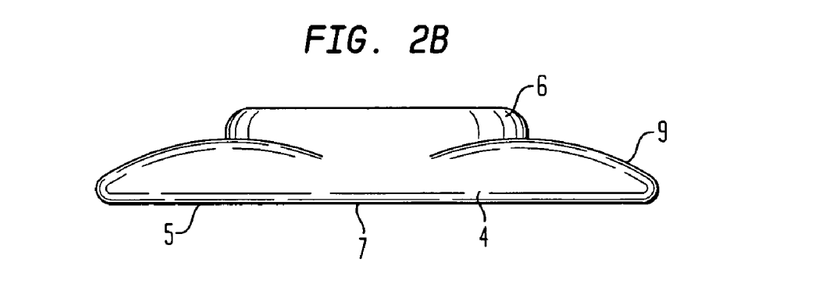
Figure 2C:
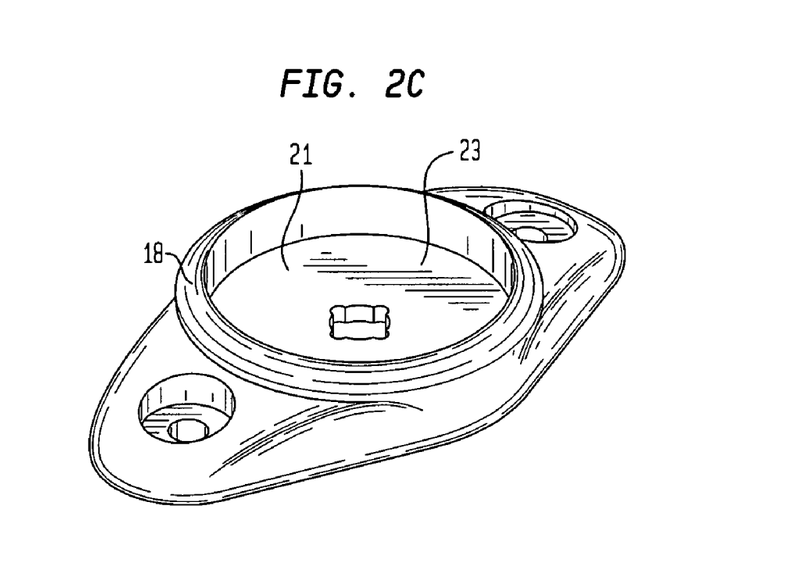

As shown in FIGS. 2A (bottom view), 2B (side view), and 2C (perspective view), one embodiment of the present invention preferably includes a collar 2 for engaging a lower surface of a cabinet (not shown). The collar 2 includes a base 4 and a flange 6. The base 4 includes a flat surface 5 for contacting a cabinet surface, an oppositely-facing first surface 9, a first tab 8 and a second tab 10 extending outwardly beyond the flange 6. As shown in the figures, the tabs 8, 10 may be placed symmetrically about the flange 6, although this is not required. Each of the tabs 8, 10 preferably includes a through-hole 12 extending through the tabs from the flat surface 5 to the first surface 9. A recess 14 may extend about the through-holes 12 and be concentrically aligned with the through-holes. The recesses 14 may be used to counter-sink anchoring elements, such as screws (not shown in the figures) that anchor the collar 2 to the cabinet mount surface. The collar 2 further includes an aperture 19 extending from a bottom surface 21 of flange 6 to the flat surface 5 of the base portion 4.

The base 4 includes a recess 7, best shown in FIG. 1 disposed within and adjacent the flat surface 5. The first surface 9 encompasses surfaces of the tabs 8, 10 and may be relatively flat or curved, as shown in the figures. The flange 6 extends outwardly beyond the first surface 9 of the base 4.

As seen in FIG. 2A flange 6 is defined by an interior circumferential wall 15 which is adjacent to a ledge 16. The ledge 16 or curved outer surface extends between interior circumferential wall 15 and an exterior wall 18 of the flange. The exterior wall 18 is preferably circumferential, as shown in the figures, and is adjacent to the first surface 9 of the base 4.

Figure 3A:
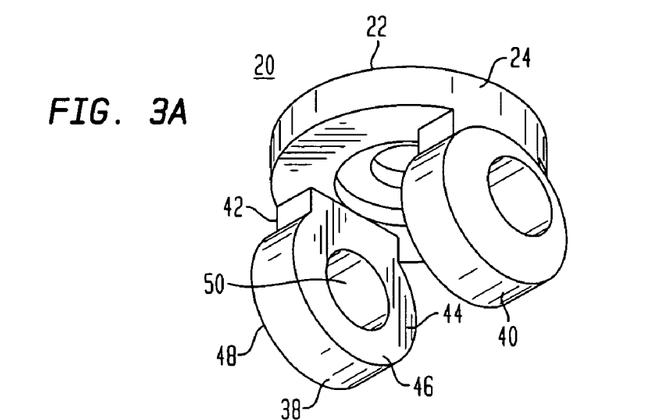
FIGS. 3A-3E are respective views of an embodiment of a swivel coupler according to the present invention.
Figure 3B:
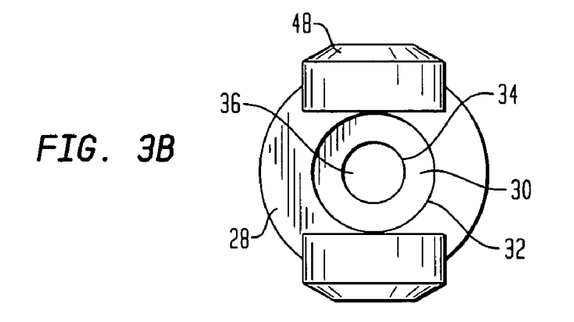
Figure 3C:
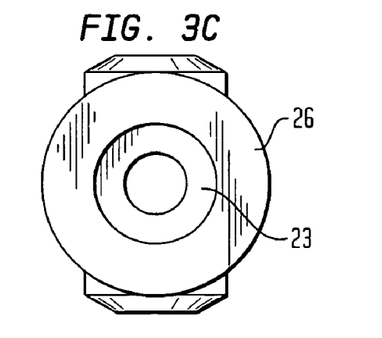
Figure 3D:
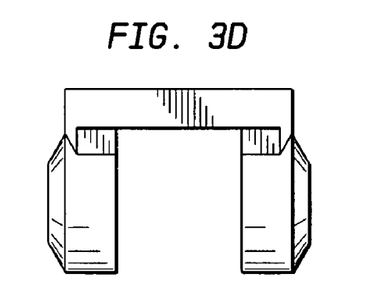
Figure 3E:
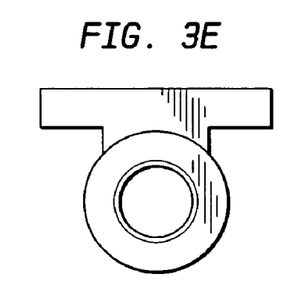

As shown in FIGS. 3A (perspective view), 3B (bottom view), 3C (top view), 3D (front view) and 3E (side view), the cabinet mount arm 1 of the present invention also preferably includes a swivel coupler 20. The swivel coupler 20 includes a base portion 22 that is preferably circular and includes an exterior wall 24, a top surface 26 and a bottom surface 28. The top surface 26 includes a recess 23, depression or groove disposed thereon. And the bottom surface 28 preferably includes a recess 30 defined by interior wall 32, both of which, the recess and interior wall preferably being circular, as shown in the figures. The recess 30 also includes a shoulder 34 delimiting the recess. A bore 36 extends from the shoulder 34 to top surface 26 such that it is disposed within the recess 30.

The swivel coupler 20 also preferably includes two extensions 38, 40 extending downwardly from the bottom surface 28 of the base portion 22. The two extensions 38, 40 are preferably symmetrically positioned about recess 30 of base portion 22 and have corresponding structures. Therefore, for clarity and efficiency purposes, only one of the extensions, extension 38, will be described herein. Extension 38 includes a neck 42 adjacent the bottom surface 28 of the base portion 22. The neck 42 transitions into a ring 44 having an interior surface 46 and an exterior surface 48. As shown in the figures, exterior surface 48 may be beveled, tapered or it may be conical shaped or otherwise angled. A through-hole 50 extends through the ring 44 from the interior surface 46 to the exterior surface 48. The through-hole 50 of ring 44 is preferably aligned with a through-hole of extension 40.

Figure 4A:
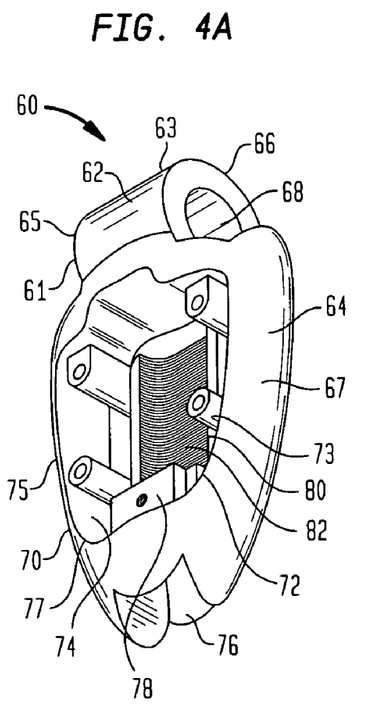
FIGS. 4A-4E are respective views of an embodiment of an arm according to the present invention.

As shown in FIGS. 4A (rear perspective view), 4B (front perspective view), 4C (rear view), 4D (side view) and 4E (bottom view), the cabinet mount arm 1 of the present invention preferably also includes arm 60. The arm 60 includes elongate ring 62 and a housing 64 extending downwardly from the elongate ring. Elongate ring 62 includes exterior wall 63 positioned between edges 65, 66. An aperture 68 extends from edge 65 to edge 66 so as to create a through-hole within the elongate ring 62. In a preferred embodiment, the elongate ring 62 is substantially cylindrical at least along the top portion as shown in the figure. At least one hole 61 and preferably two may extend from the exterior wall 63 of the elongate ring 62 through the elongate ring and into communication with aperture 68.

Housing 64 extends downwardly from a bottom portion of the elongate ring 62 and includes a front face 69 and a rear face 70. The front face 69 and the rear face 70 comprise part of the outer surface 67 of the housing 64. The housing 64 is preferably symmetrically positioned relative to the elongate ring 62 and relative to an axis A. The rear face 70 of the housing includes an alcove 72 defining a recess within the housing 64. Disposed within the alcove 72 is a plurality of generally cylindrical members 73 or posts. The members 73 may be attached to an interior wall 74 or may stand alone and remote therefrom. The members 73 extend outwardly from side wall 75 of housing 64.

The arm 60 and specifically housing 64 also includes a channel 76, which is desirably aligned along the axis A. The channel 76 is positioned in a lower portion of the housing and extends from the outer surface 67 to the alcove 72. A tab 78 extends outwardly from interior wall 74 and includes a threaded hole 77, and is preferably aligned with the channel 76. The alcove 72 also includes a beam 80 extending from an upper portion of the housing 64 to a lower portion of the housing. The beam 80 is also preferably aligned with the channel 76. The beam 80 includes a plurality of ridges 82 preferably having a curved or arcuate structure as shown in FIG. 4A.

Figure 4B:
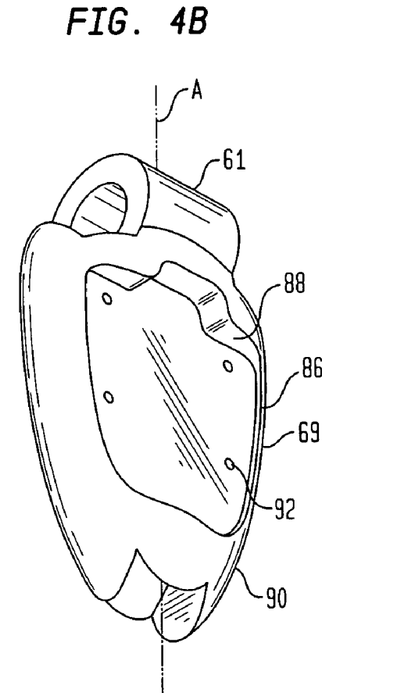
Figure 4C:
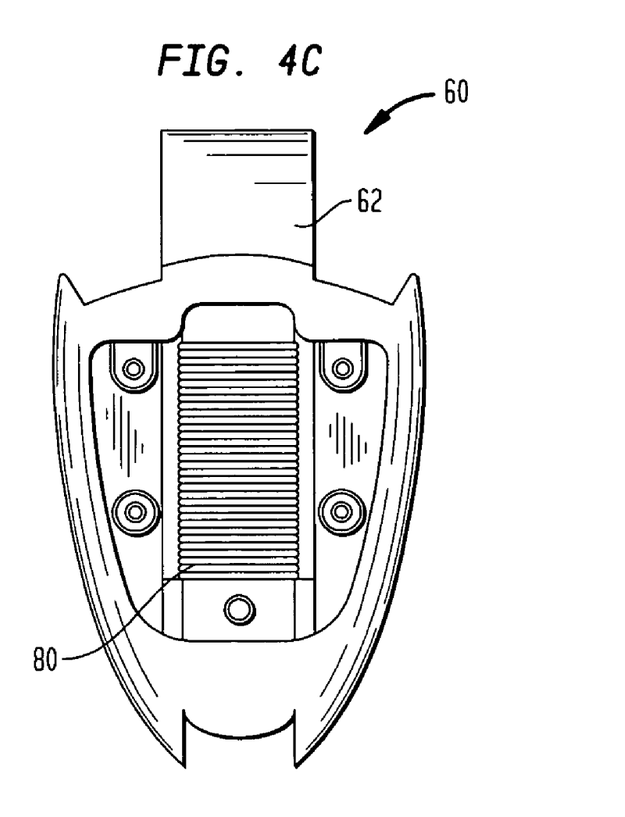
Figure 4D:
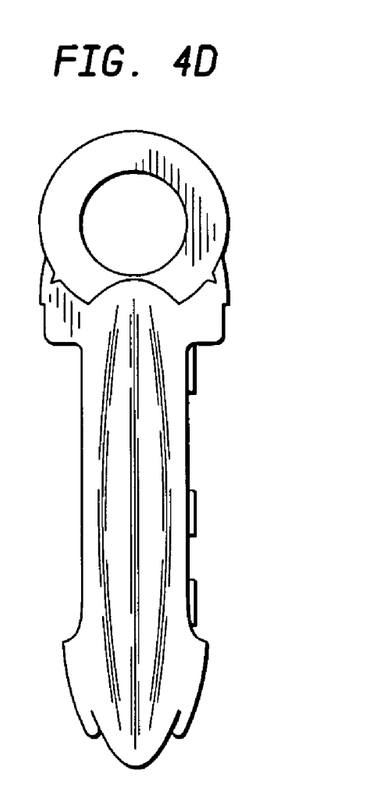
Figure 4E:
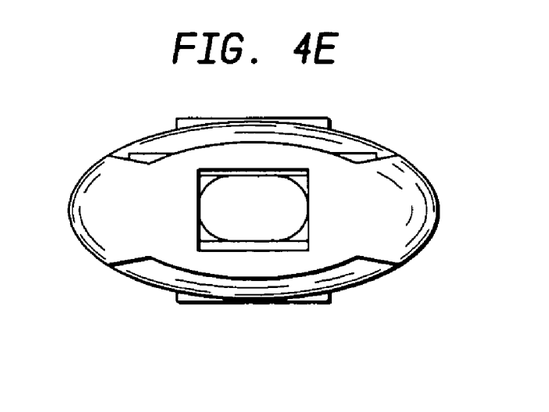

The front face 69 of the housing 64 includes a cutout or shaped surface 86 defined by an interior wall 88 and side wall 90. Side wall 90 includes a plurality of holes 92 extending through the side wall and aligned with the substantially cylindrical members 73 so as to extend therethrough as well.

Figure 5A:
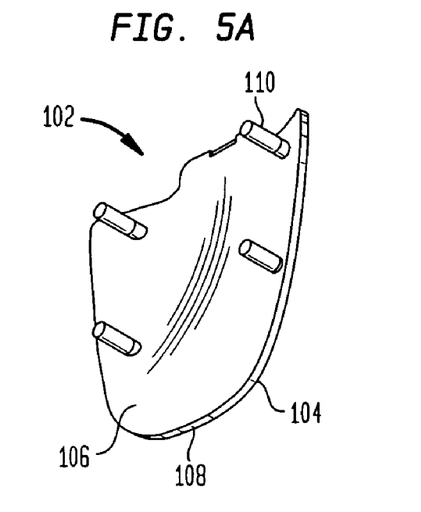
FIGS. 5A-5I are respective views one embodiment of a front cover and a rear cover according to the present invention.
Figure 5B:
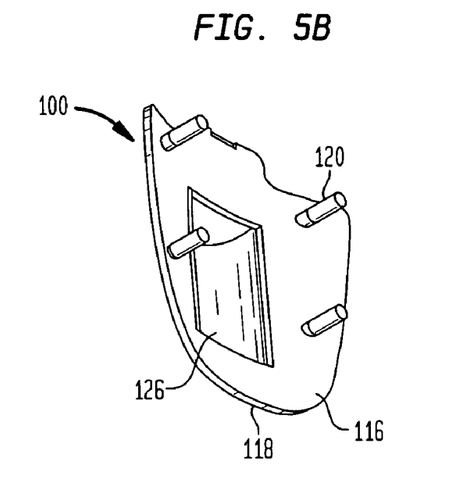
Figure 5C:
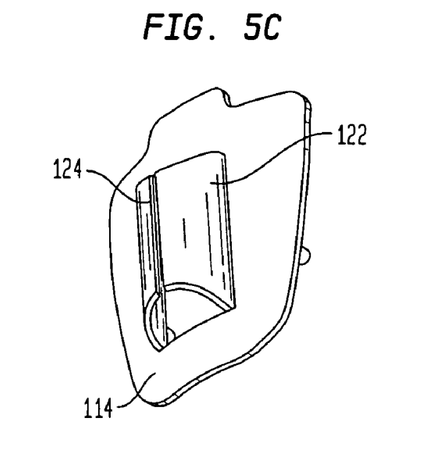
Figure 5D:
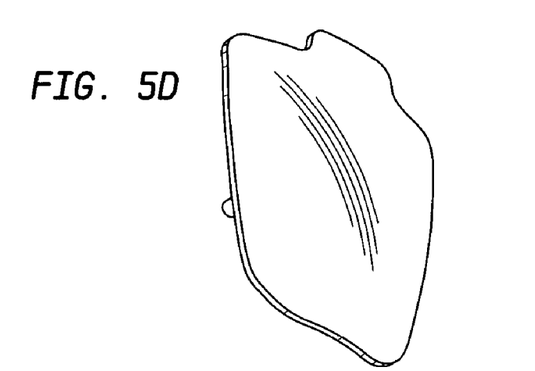
Figure 5E:
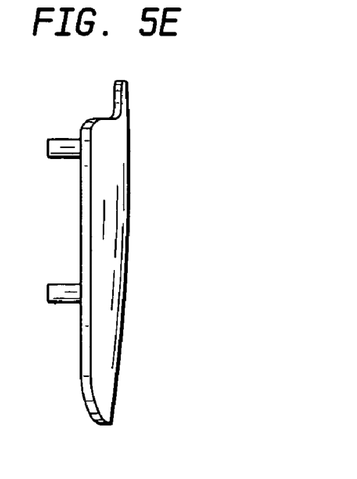
Figure 5F:
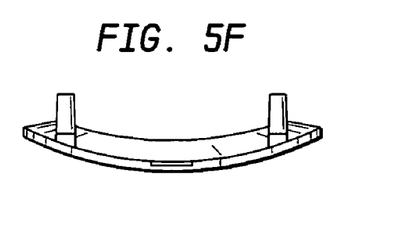
Figure 5G:
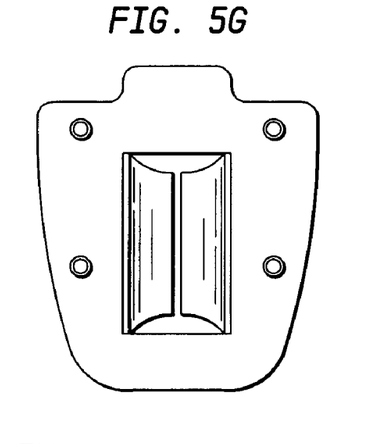
Figure 5H:
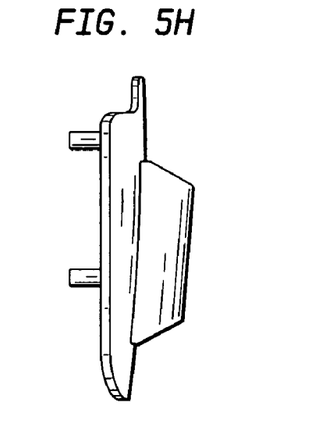
Figure 5I:
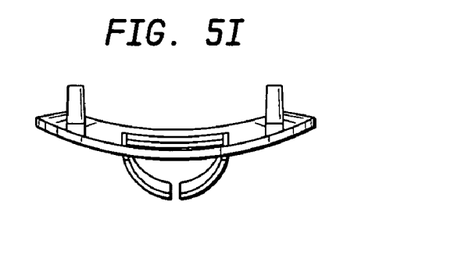

The arm 60 also preferably includes a front cover 100 and a rear cover 102. The rear cover is shown in FIGS. 5A (front perspective view), 5D (rear perspective view), 5E (side view), and 5F (top view). The front cover is shown in FIGS. 5B (rear perspective view), 5C (front perspective view), 5G (rear view), 5H (side view) and 5I (top view). The rear cover 102 includes an outer surface 104 and an inner surface 106 connected to the outer surface by edge 108. Extending outwardly from inner surface 106 is a plurality of posts 110. The rear cover 102 and, specifically its surfaces 104, 106, including the edge 108, are shaped so as to correspond with alcove 72 of housing 64. In a method of assembling, the plurality of posts 110 are aligned with cylindrical members 73 of alcove 72 and snap-fitted therein with the outer surface 104 forming a substantially continuous surface with rear face 70.

Similarly, front cover 100 includes an outer surface 114, an inner surface 116 and an edge 118 extending about the front cover 100 and adjacent the outer and inner surfaces. The front cover 100 also includes a plurality of posts 120 extending outwardly from inner surface 116. The outer surface 114 also includes a substantially curved wall 122 extending from one part of the outer surface to another part of the outer surface. The curved wall 122 has a slot 124 extending through the middle of the curved wall so as to create two substantially spherical curved walls. The front cover 100 also includes opening 126 extending from the inner surface 116 to the outer surface 114. Opening 126 is substantially aligned with curved wall 122 such that the curved wall forms a partial boundary about the opening. The curved wall 122 may be used for cable management of any and all wires extending adjacent the cabinet mount arm 1.

In a method of assembly, the rear cover 122 is positioned over the cutout 86 such that the posts 120 are aligned with holes 92 and snap-fitted or compression-fitted therein. Once the front cover 100 has been assembled to the housing 64, the outer surface 114 of the front cover 100 forms a substantially continuous exterior along with outer surface 67 of the housing 64.

Figure 6A:
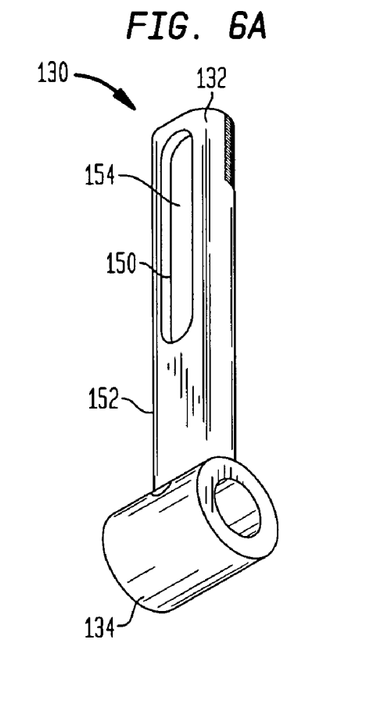
FIGS. 6A-6E are respective views of an embodiment of an additional arm according to the present invention.
Figure 6B:
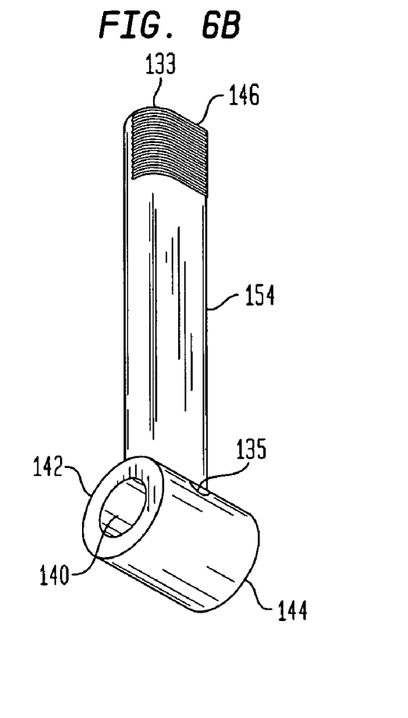
Figure 6C:
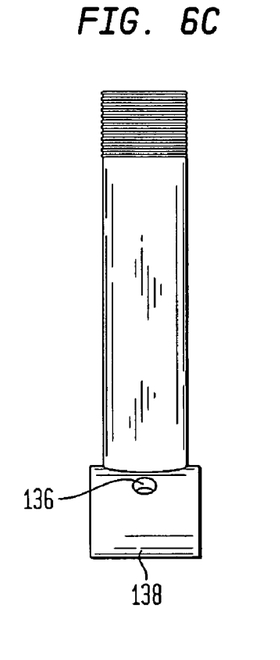

Another element of the preferred embodiment of the cabinet mount arm 1 is arm 130, which is illustrated in FIGS. 6A (rear perspective view), 6B (front perspective view), 6C (front view), 6D (side view) and 6E (rear view). The arm 130 includes a post 132 and an elongate ring 134 disposed at a lower portion of the post. The post 132 has a first end 133 and a second end 135, remote from the first end. Elongate ring 134 is substantially similar to the elongate ring 62 of arm 60 and similar to elongate ring 62, it includes at least one through-hole 136 and preferably two through-holes, extending from an exterior surface 138 to an aperture 140 of the elongate ring. The aperture 140 of the elongate ring 134 extends from a first edge 142 to a second edge 144 of the ring.

Figure 6D:
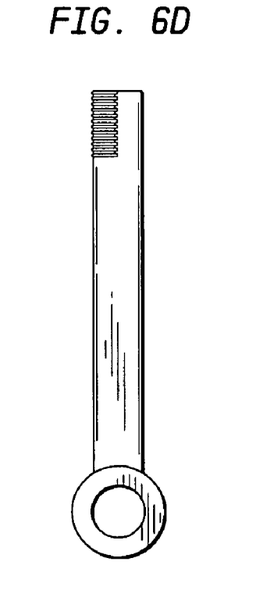
Figure 6E:
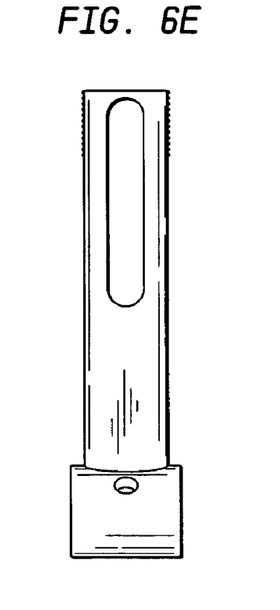

The post 132 includes a plurality of ridges 146 disposed along the first end 133 of the post. The post 132 is preferably arcuate or curved along the first end 133, such that the ridges 146 are also arcuate or curved along their ends. The ridges 146 are configured to engage the plurality of ridges 82 on the beam 80. As shown in FIG. 6D, the ridges 146 may extend around to the sides of the post 132. The post 132 further includes an elongate slot 150 extending from a side wall 152 of the post to a center portion 154 of the post. In a preferred embodiment, as shown in the figures, the edges 142, 144 of the elongate ring 134 extend outwardly beyond a perimeter 154 of the post.

Figure 7A:
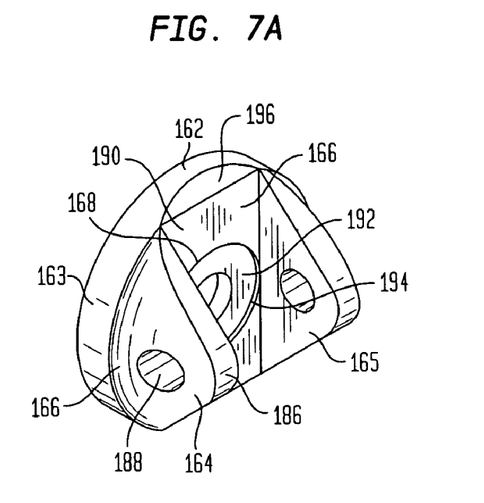
FIGS. 7A-7E are respective views an embodiment of a pivot coupler according to the present invention.
Figure 7B:
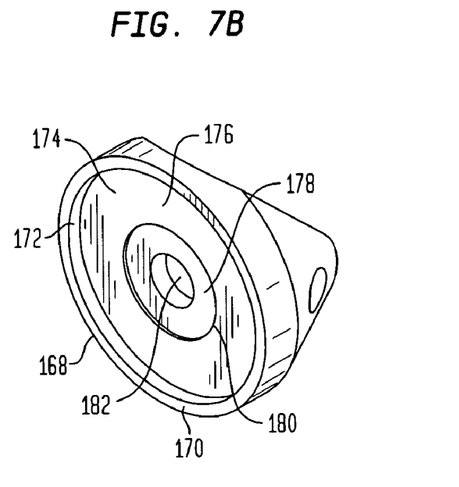
Figure 7C:
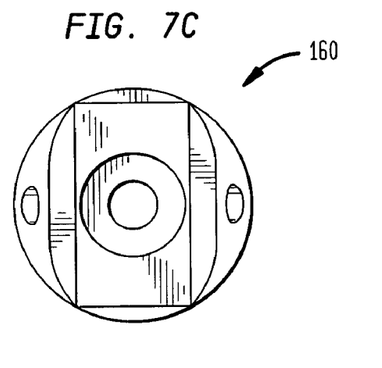
Figure 7D:
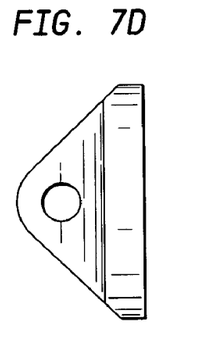
Figure 7E:
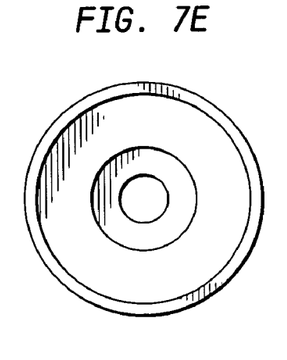

The cabinet mount arm 1 of the present invention also preferably includes a pivot coupler 160, as shown in FIGS. 7A (rear perspective view), 7B (front perspective view), 7C (rear view), 7D (side view), and 7E (front view). The pivot coupler 160 includes a base portion 162 and two wings or flanges 164, 165 extending outwardly from a rear surface 166 of the base portion. The base portion also includes a front surface 168 having an edge 170 that is preferably circular. Adjacent to edge 170 is circumferential wall 172 which deliminates recess 174 on front surface 168. Recess 174 includes a first circular wall 176 and a second circular wall 178. The circular walls 176, 178 are attached by shoulder 180 which extends therebetween. The second circular wall 178 is positioned on a different plane than the first circular wall 176. An aperture 182 extends from the second circular wall 178 to and through surface 166.

Wing 164 is substantially similar to wing 165. Therefore, for efficiency, only one of the wings will be described herein. Wing 164 includes an exterior wall 166 and an interior wall 168. In a preferred embodiment as shown in the figures, interior wall 168 is preferably flat or planar while exterior wall 166 is arcuate or curved. The exterior wall 166 preferably extends outward from the circumferential edge 163 to an edge 186 of the wing 164. A bore 188 extends through the ring 164 from the exterior wall 166 to the interior wall 168. The bore 188 of ring 164 is preferably aligned with a bore on wing 165. The two wings 164, 165 are separated by a gap 190 partially defined by the rear surface 166 of the base portion 162. The rear surface, disposed within gap 190 includes a circular wall 192 defined by a shoulder 194, which is adjacent to the rear surface 166. The aperture 182 of the pivot coupler 160 extends through the circular wall 192. In a preferred embodiment, circular walls 176, 178, and 192 are concentric with aperture 182. The rear surface 166 may also include a chamfered edge 196, as shown in the figures.

Figure 8A:
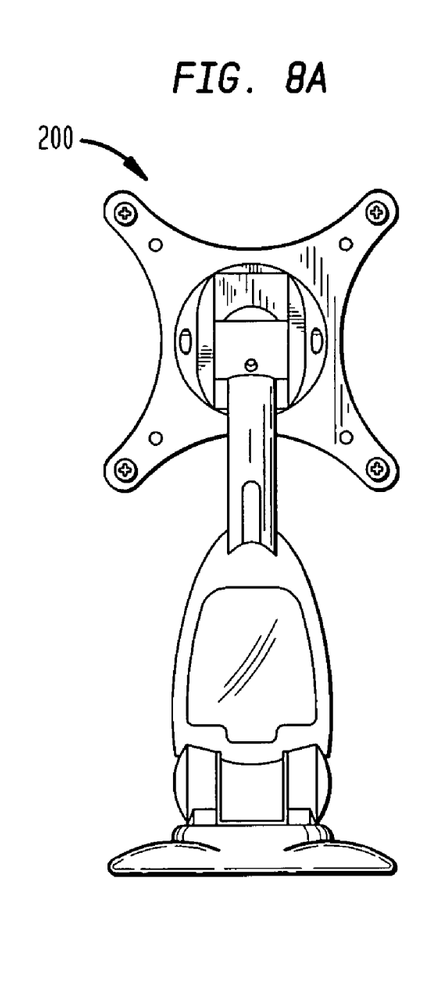
FIGS. 8A-8C are respective views of an embodiment of a plate according to the present invention.
Figure 8B:
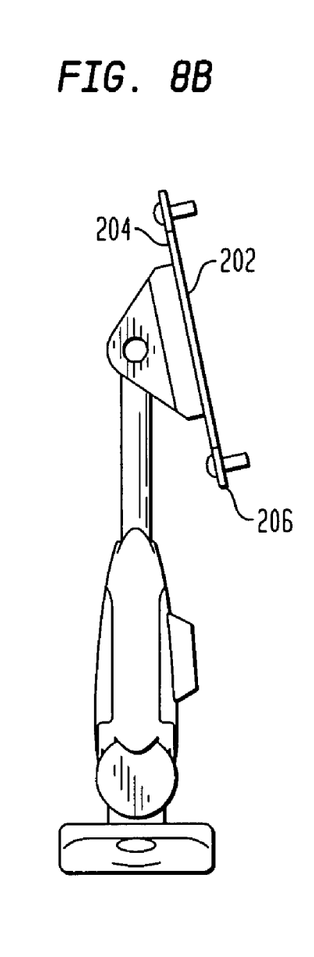
Figure 8C:
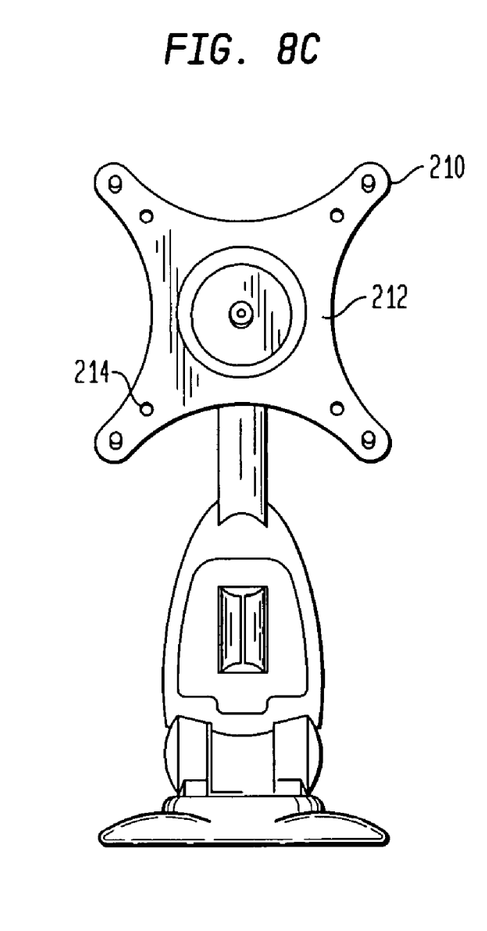

The cabinet mount arm 1 may also include a plate 200 having a front side 202, a rear side 204 and an edge 206 extending therebetween, as shown in FIGS. 8A (rear view), 8B (side view), and 8C (front view). The plate 200 preferably includes a plurality of appendages 210 extending outwardly from a main portion 212 of the plate. Although FIGS. 8A-8C illustrate the plate 200 having four appendages 210, any number of appendages may be used so as to easily mount the plate to a screen or monitor as will be described below. Each of the appendages 210 may include at least one or more through-holes 214. The through-holes 214 are preferably Vega compatible.

Figure 9A:
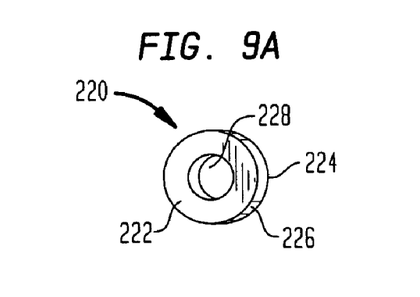
FIGS. 9A-9E are respective views of additional elements of the present invention.

Although some of the larger and more detailed elements of cabinet mount arm 1 have been described, the cabinet mount arm 1 may also include additional elements. For instance, as shown in FIG. 9A, the cabinet mount arm 1 may include one or more flat washers 220 having a first surface 222, a second surface 224 and an edge 226 extending therebetween. A through-hole 228 extends from the first surface 222 to the second surface 224.

Figure 9B:
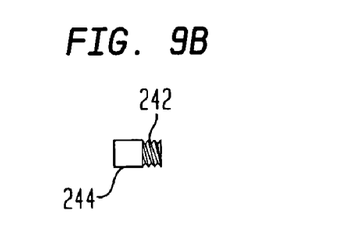

As shown in FIG. 9b, the cabinet mount arm may also include one or more thumb screws 240 having a threaded portion 242 and a non-threaded portion 244

Figure 9C:
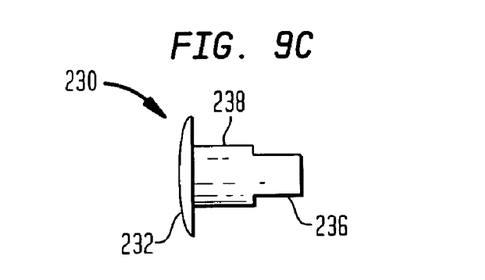

As will be discussed below, a plurality of rivets 230, as shown in FIG. 9C, may also be used in conjunction with the cabinet mount arm 1 in order to facilitate the interconnection between elements of the arm. Rivets 230 preferably include a cap 232 and a post 234. Post 234 may include a first cylindrical portion 236 and a second cylindrical portion 238. The diameter of the second cylindrical portion 238 is larger than the diameter of the first cylindrical portion 236. In addition, the cap 232 preferably extends outwardly beyond the second cylindrical portion 238 such that the cap overhangs substantially all sides of the second cylindrical portion 238.

Figure 9D:
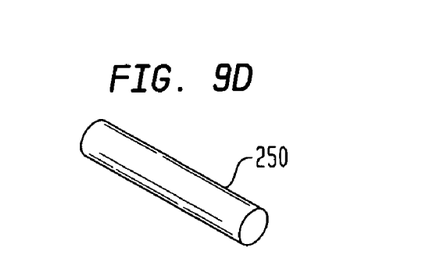
Figure 9E:
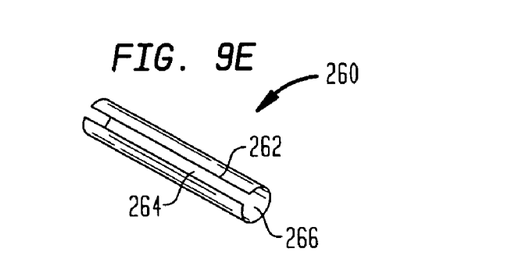

Besides various screws and so forth, the cabinet mount arm 1 of the present invention may also utilize a plurality of tubular members, such as split bushings 260 and cylindrical rods 250 consisting of substantially an elongated circle. Tubular members 260 preferably include a cylindrical body 262 having a slot 264 extending substantially or completely along a length of the tubular member 260. The tubular members 160 also include a channel 266 extending their length so that the tubular member is hollow. Thus, the construction of the tubular members 260 permit them to expand and contract about a central axis extending through their center.

Now that the various elements and features of the cabinet mount arm 1 have been described individually, a method of assembling the cabinet mount arm will be discussed. Although the assembly of the arm is described in sequential steps, the steps should in no way be thought of as being limiting or required to be in such order. The steps are more a description of one way of assembling the cabinet mount arm 1 but the method of assembly is not limited thereto.

In one method of assembly of the cabinet mount arm 1, the collar 2 is mounted to a surface of a cabinet, wall or the like. The collar 2 is mounted by placing the flat surface 5 against the surface of the cabinet (not shown). Screws (not shown in the figures) may then be threaded through or engaged with through-holes 12 of the collar and into the bottom surface of the cabinet. The screws preferably affix the collar to the surface of the cabinet. As shown in the preferred embodiment and discussed earlier, the through-holes 12 include recesses 14 extending thereabout. The recesses 14 extend around the through-holes so that the heads of the screws may be recessed into the collar 2 relative to the first surface of the tabs 8, 10.

Next, the swivel coupler 20 is positioned relative to the collar 2. In order to do this and still maintain movement between the elements, a flat washer 220 is preferably placed within the recess 23 of top surface 26 of the swivel collar. A second flat washer 220 is placed within recess 30 adjacent bottom surface 28 of swivel coupler 20. As with all the flat washers 220 described herein, in a preferred embodiment, the flat washers are positioned comfortably within the recess so that the flat washer may freely move while contained therein. The swivel coupler 20, including the two flat washers 220 is then coupled to the collar 2, such that the base portion 22 of the swivel coupler 20 fits within the interior circumferential wall 15 of the collar with the exterior wall 24 of the base portion confronting the interior circumferential wall. The swivel coupler 20 is preferably engaged within the collar 2 while still permitting free rotation of the swivel coupler 20. Also, the swivel coupler 20 is engaged to the collar 2 with the bore 36 of the swivel coupler being aligned with the aperture 19 of the collar 2. A rivet 230 is then placed through the swivel coupler 20 with the post 234 of the rivet extending through bore 36 of the swivel coupler and into the aperture 19 of the collar 2. In a preferred embodiment, the rivet 230 is snap fitted into the aperture 19 so that the swivel coupler 20 is locked relative to the collar 2 in a lengthwise direction, but can freely rotate relative to the collar.

Next, the arm 60 is coupled to the swivel coupler 20 by positioning elongate ring 62 of the arm into and between extensions 38, 40 of the swivel coupler 22. Prior to the elongate ring 62 being placed between the extensions 38, 40, a tubular member 260 is positioned with the aperture 68 of the elongate ring. The elongate ring 62 is then placed between the extensions 38, 40 preferably with the edges 65, 66 of the elongate ring confronting the interior surfaces 46 of the extensions 38, 40. As the arm 60 is positioned within the swivel coupler 20, the aperture 68 of the arm 60 is preferably aligned with the through-holes 50 of the extensions 38, 40 such that the aperture and through-holes are substantially aligned. A cylindrical rod 250 is translated through one extension 38 to the other extension 40 via aperture 68 and, specifically, into the channel 266 of the tubular member 260 housed in the aperture 68 of the elongate ring 62. Preferably, the cylindrical rod 250 extends from one extension 38 to the other extension 40. Although not shown in the drawings, the cylindrical rod 250 and extensions 38, 40 may have engaging threads that permit the rod to be affixed relative to the extensions.

In order to lock the arm 60 relative to the swivel coupler 20, a thumb screw 240 is threadably engaged with a hole 61 in elongate ring 62. The thumb screw 240 is translated downward until it contacts tubular member 260. As the thumb screw 240 is further translated through hole 61, it causes the tubular member 260 to constrict about the cylindrical rod 250. As previously alluded to, two thumb screws 240 may be placed in through-holes of the elongate ring 62. With the cylindrical rod 250 threadably engaged to the swivel coupler 20, the tubular member 260 can also be affixed to the swivel coupler. Thus, by constricting the tubular member 260 about the cylindrical rod 250, the "joint"—the cylindrical rod, the tubular member thumb screw 240—can be affixed in place. With the "joint" fixed in place, the arm 60 is fixed relative to the swivel coupler 20. For this reason, prior to fixing the "joint," the arm 60 can be pivoted about the cylindrical rod 250 into a desired position. And once positioned correctly, it can be locked in place. Of course, since the swivel coupler 22 can rotate relative to the collar 2, once affixed to the swivel coupler, so can arm 60.

Arm 130 may next be placed within the housing 64 of arm 60. In order to accomplish this, the top portion 148 of the arm 130, i.e., the post 132, is translated through channel 76 of the housing 64 with the ridges 146 disposed on the post facing the elongated beam 80 disposed within the alcove 72. In this configuration, the slot 150, disposed within the post 132, is facing outwardly away from the ridges 82 of the elongated beam 80. The post 132 may be positioned at different locations along the elongated beam 80 depending on the requirement of the user. By positioning the arm 130 closer to the elongate ring 62, the overall length of the cabinet mount arm 1 is less as compared to when the arm 130 is positioned closer to the channel 76 of the housing 64.

With the slot 150 facing outwardly, it may be aligned with threaded hole 77 of tab 78. A thumb screw 240 or other anchoring mechanism may then be placed within the threaded hole 77 urged into slot 150. The thumb screw can be forced against the post 132 to thereby lock the post relative to the alcove.

Once the arm 130 has been correctly positioned and fastened to the housing, front cover 102 and rear cover 100 may be assembled to the housing 64 as earlier described.

Prior to the arm 130 being coupled to the pivot coupler 160, the pivot coupler may be attached to plate 200. In order to do this, a flat washer 220 is disposed against the second circular wall 178 of recess 174 of the base portion 162. The pivot coupler 160 is then positioned adjacent to rear side 204 of the plate 200 such that a ridge 213 of the rear surface is received within recess 174 and confronts circumferential wall 172 of the base portion 162. A second flat washer 220 is then positioned against circular wall 192 with the edge 226 of the flat washer 220 facing shoulder 194. Preferably, the through-holes 228 of the flat washers 220 are aligned with aperture 182 of the pivot coupler 160. A rivet 230 is then translated through the through-holes 228 of the flat washers 220 and aperture 182 of the pivot coupler 160 and snap-fitted into aperture 214 of the plate 200. This configuration permits the pivot coupler 160 to be coupled to the plate 200 while still being able to rotate relative thereto.

Next, the pivot coupler 160 is attached to the arm 130 and specifically to the elongate ring 134 of the arm. Similarly, as previously described with reference to the swivel coupler 20 and elongate ring 62 of arm 60, the elongate ring 134 of arm 130 is positioned between wings 164, 165 of the pivot coupler 160. The elongate ring 134 is positioned within gap 190 of the pivot coupler 160 such that edges 142, 144 confront the interior walls 168 of the extensions 164, 165, respectively. As with the elongate ring 62 of the arm 60, prior to the insertion of the elongate ring 134 between extensions 164, 165, a tubular member 260 is positioned within the aperture 140 of the elongate ring 134. The elongate ring 134 of arm 130 is disposed within the gap 190 with the aperture 140 preferably being aligned with bores 188 of wings 164, 165.

With the elongate ring 134 positioned within gap 190, a thumb screw 250 is slidably translated through bore 188 of leg 164 and into and through aperture 140 of the elongate ring 134. As discussed with reference to elongate ring 62, when the cylindrical rod is placed within the aperture 140 of the elongate ring 134, it is also placed within the channel 266 of the tubular member 260, the tubular member being already disposed within the aperture 140.

In one preferred embodiment, the cylindrical rod 250 is slid entirely through bore 188, aperture 140 and into the bore of wing 165 with one end of the cylindrical rod being positioned within the bore of wing 164 and the other end of the cylindrical rod 250 being positioned within the bore of wing 165. The cylindrical rod 250 may include threads that engage threads within bore 188 so as to tightly affix the cylindrical rod relative to the pivot coupler 160. In order to lock the arm 130 relative to the pivot coupler 160, the arm is first placed in the desired position relative to the pivot coupler. Next, a thumb screw 240 is threadably engaged through-hole 136 of the elongate ring 134 and translated through the through-hole 136. Of course more than one thumb screw may be used if so desired. As the thumb screw 240 is translated through the through-hole 136, a contact tubular member 260 disposed within aperture 134 and begins to constrict the tubular member 260 about a central axis passing through the tubular member. The tubular member 260 is constricted until the tubular member is placing a compression force against the cylindrical rod 250 thereby locking the tubular member to the cylindrical rod. This interaction between the elements causes the arm 130 to be tightly affixed to the pivot coupler 160.

With the cabinet mount arm 1 being assembled, a display screen 1000, such as that shown in the FIG. 1, may then be mounted to the plate 200 using various screws and so forth. Due to the rotateability between the swivel coupler 20 and collar 2 as well as the rotateability of the pivot coupler 160 and plate 200, the display 1000 may be rotated, pivoted, tilted and so forth, relative to the cabinet mount arm 1. In addition, if the user wishes to lower or higher the display 1000 relative to the positioning of the collar 2, arm 130 may simply be lowered or raised relative to arm 60. In order to accomplish this, the thumb screw 240 disposed within tab 78 and specifically the threaded hole within the tab 78, is loosed to allow the post 134 of arm 130 to maneuver up or down. Once a desired positioning of the arm 130 is determined, the arm 130 and specifically ridges 146 may engage ridges 82 of the elongated beam 80 within alcove 72. The thumb screw 240 may then be tightened within the threaded hole of tab 78 until it places a force against post 134 and specifically within the center portion 154 within slot 150. In addition, various other tilting and/or positioning of the display 1000 is required, the thumb screws engaging elongate ring 62 and elongate ring 134 may be translated outwardly therefrom such that the respective tubular members 260 no longer constrict about the respective cylindrical rods 250. This enables the respective elements, e.g., arm 60 relative to swivel coupler 20, and arm 130 relative to swivel coupler 162 pivot. Once again, once the desired relationships have been reached between the various elements, thumb screws 240 may be translated through the hole so thereby constrict the tubular member 260 about the respective cylindrical rods 250 to thereby tighten the cabinet mount arm 1 in a desired manner.

Figure 10:
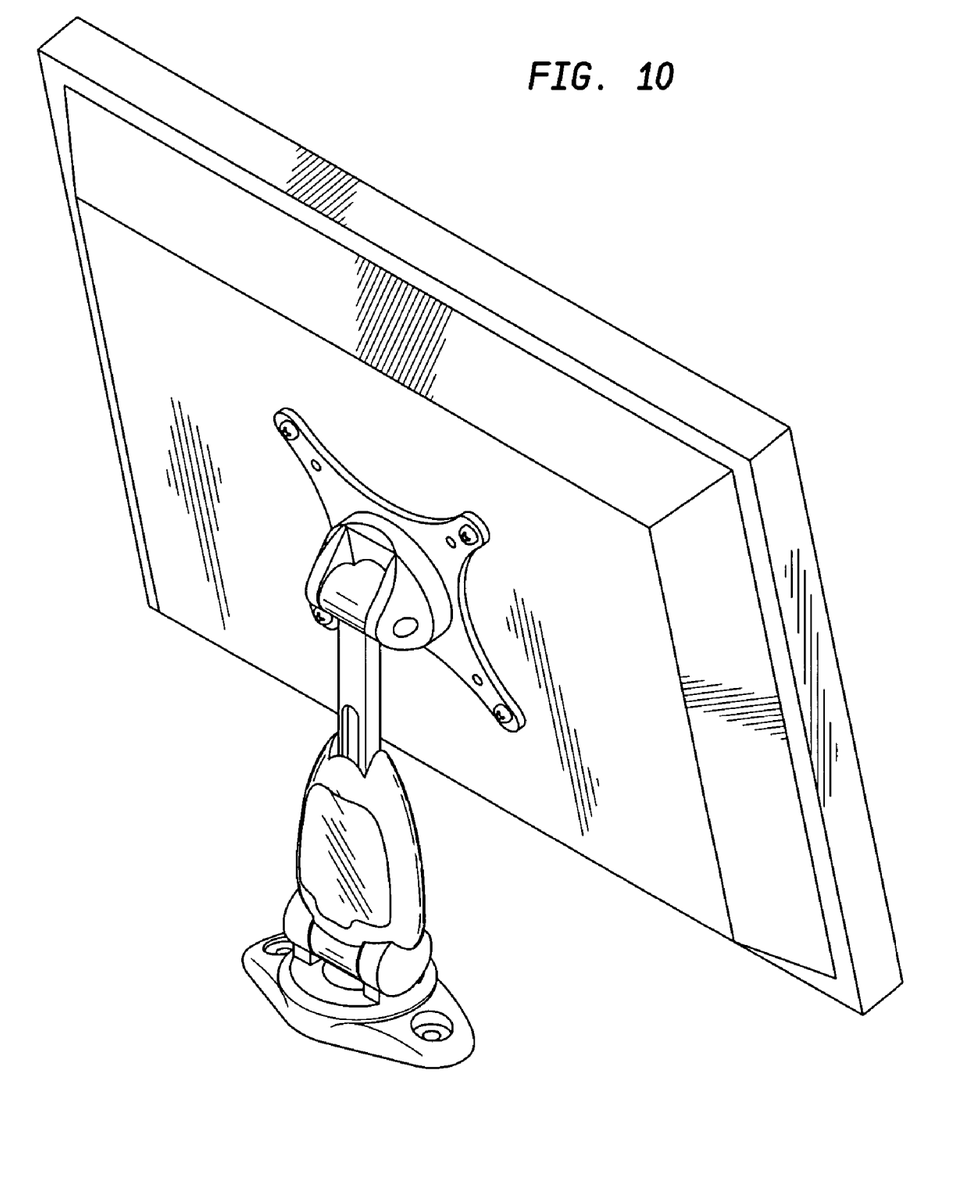
FIG. 10 illustrates one embodiment of the present invention assembled.

FIG. 10 illustrates an assembled cabinet mount arm 1 extending downward from a cabinet and having a peripheral monitor attached thereto. In one preferred embodiment, elements demarked as "A" allow for the rotation between adjacent elements and elements denoted by "B" allow for various pivoting between elements when in a non-tightened state. Further, the element demarked by "C" enables the length of the cabinet mount arm 1 to be either increased or decreased depending on the relationship between the two elements. Although the present invention has been shown with various points, locations and joints which can ease the maneuverability of the display 1000 relative to the user, these joints may be placed in different order or may include various numbers of similar drawings disposed along a length in order to ease the manipulation of the display 1000.

In one preferred embodiment, various elements of the present invention may be constructed from die cast aluminum, plastic or similar material.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A cabinet mount arm comprising:
an arm having an elongate ring and a housing extending therefrom, said elongate ring having a first edge, a second edge, an interior wall and an exterior wall, said interior wall and said exterior wall extending between said first edge and said second edge, said elongate ring further including an aperture extending from said first edge to said second edge and defined by said interior wall of said elongate ring, said elongate ring also including a through-hole extending from said exterior wall to said interior wall and in communication with said aperture;
an anchoring mechanism disposed within said through-hole of said elongate ring;
a tubular member having a first end, a second end and an exterior, and a channel extending from said first end of said tubular member to said second end of said tubular member, said tubular member also having a slot along said exterior that is in communication with said channel, such that said tubular member is capable of constricting and expanding about an axis passing through a center of said tubular member and extending from said first end to said second end, said tubular member being disposed within said aperture of said elongate ring;
a swivel coupler having a base portion, a first extension and a second extension, each of said first and second extensions extending outwardly from said base portion and forming a gap therebetween, each of said first and second extensions having an exterior, an interior and an aperture extending therebetween, said aperture of said first extension having internal threads, wherein said elongate ring of said arm is disposed between said first extension and said second extension such that said first edge of said elongate ring confronts said interior of said first extension and said second edge of said elongate ring confronts said interior of said second extension;
a cylindrical rod having a first end, a middle portion and a second end, said first end having external threads, said rod being disposed within said apertures of said first and second extensions and said channel of said tubular member with said external threads of said first end engaged within said internal threads of said aperture of said first extension;
wherein as said anchoring mechanism is translated through said through-hole of said arm in a direction toward said aperture of said elongate ring, it contacts said tubular member and causes said tubular member to constrict about said cylindrical rod to thereby lock said tubular member to said cylindrical rod.

2. The cabinet mount arm according to claim 1, wherein said second extension's aperture has internal threads and said second end of said cylindrical rod has external threads that engage the internal threads of said second extension's aperture.

3. The cabinet mount arm according to claim 1, further comprising a collar adapted for mounting to a vertical or horizontal platform, said swivel coupler being rotatably mounted to said collar.

4. The cabinet mount arm according to claim 3, wherein said collar includes a flange and a base, said flange having a recess disposed thereon and an aperture extending through said flange and said base, said swivel coupler having an aperture extending through said base portion thereof, wherein said swivel coupler is rotatably coupled to said collar by placing said base portion of said swivel coupler into said recess of said collar and placing a rivet through said aperture of said base portion of said swivel coupler and into said aperture of said collar.

5. The cabinet mount arm according to claim 1, wherein prior to locking said tubular member to said cylindrical rod, said elongate ring may pivot about said cylindrical rod.

6. The cabinet mount arm according to claim 1, further comprising an arm having a post with a first end and a second end, said first end having a plurality of ridges disposed thereon, said housing having an alcove disposed therein with a plurality of ridges disposed therein and a channel extending through said housing and in communication with said alcove, wherein said first end of said post is placed through said channel and into said alcove, further wherein said plurality of ridges on said post engage said plurality of ridges in said alcove.

7. The cabinet mount arm according to claim 6, wherein said housing includes a through-hole and a fastener disposed therein, said through-hole extending through said housing and into communication with said channel, said post having a slot that is aligned with said through-hole, such that as said fastener is translated into said through-hole it is positioned within said slot and engages said post.

8. The cabinet mount arm according to claim 7, wherein said slot is elongated such that said post may be translated along a longitudinal axis extending from said first end of said post to said second end of said post with said slot remaining aligned with said through-hole of said housing.

9. The cabinet mount arm according to claim 8, wherein said second end of said post in attached to an elongate ring, said elongate ring adapted for being pivotable coupled to a plate.

10. The cabinet mount arm according to claim 9, wherein said elongate ring is connected to said plate by a connecting means adapted to allow rotation of said plate relative to said elongate ring.

11. A cabinet mount arm comprising:
a housing having an exterior, an alcove and a channel extending from said exterior to said alcove, said housing further having a through-hole extending from said exterior to said channel, said alcove having a plurality of ridges disposed within;
a post having a first surface, a first end, a second end and a slot disposed on said first surface, said post further having a plurality of ridges exposed on said first end; and
a screw positioned within said through-hole;
wherein said first end of said post is translated through said channel, such that said plurality of ridges of said first end engage said plurality of ridges disposed within said alcove and said slot is aligned with said through-hole; wherein said screw is translated towards said slot and engages said post such that said post is locked relative to said housing.

12. The cabinet mount arm according to claim 11, wherein said housing includes a tab that is coverable, said tab having said through-hole disposed therein.

13. The cabinet mount arm according to claim 11, further comprising a longitudinal axis extending from said first end of said post to a second end of said post, said slot being elongated in a direction of said slot, said post being moveable along said longitudinal axis such that said plurality of ridges of said post still engages said plurality of ridges in said alcove and said slot is aligned with said through-hole.

14. The cabinet mount arm according to claim 11, wherein said second end of said post includes an elongate ring adapted for connecting to a plate via a connection means that allows said plate to rotate relative to said post, said plate adapted for connecting to a flat screen peripheral device.

* * * * *